US011858663B2

(12) United States Patent
Strzelecki et al.

(10) Patent No.: US 11,858,663 B2
(45) Date of Patent: Jan. 2, 2024

(54) METHOD FOR PRODUCING A SATELLITE FROM A GENERIC CONFIGURATION OF ANTENNA ELEMENTS

(71) Applicant: AIRBUS DEFENCE AND SPACE SAS, Toulouse (FR)

(72) Inventors: Jérôme Strzelecki, Toulouse (FR); Yann Bappel, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 85 days.

(21) Appl. No.: 17/909,323

(22) PCT Filed: Mar. 3, 2021

(86) PCT No.: PCT/EP2021/055290
§ 371 (c)(1),
(2) Date: Sep. 2, 2022

(87) PCT Pub. No.: WO2021/175903
PCT Pub. Date: Sep. 10, 2021

(65) Prior Publication Data
US 2023/0150694 A1  May 18, 2023

(30) Foreign Application Priority Data
Mar. 4, 2020 (FR) ...................................... 2002186

(51) Int. Cl.
*B64G 1/10* (2006.01)
*B64G 1/22* (2006.01)
(Continued)

(52) U.S. Cl.
CPC ............... *B64G 1/10* (2013.01); *B64G 1/222* (2013.01); *B64G 1/66* (2013.01); *H01Q 1/288* (2013.01); *H01Q 15/161* (2013.01)

(58) Field of Classification Search
CPC . B64G 1/10; B64G 1/222; B64G 1/66; H01Q 1/288; H01Q 15/161
See application file for complete search history.

(56) References Cited

U.S. PATENT DOCUMENTS

| 11,319,092 | B2* | 5/2022 | Cael | B64G 1/002 |
| 2002/0135532 | A1* | 9/2002 | Chiang | H01Q 1/084 |
| | | | | 343/880 |
| 2017/0158357 | A1 | 6/2017 | Hart, III | |

FOREIGN PATENT DOCUMENTS

FR    2 780 819    1/2000

OTHER PUBLICATIONS

Ahmed, G. et al., "Modern Communication Satellite Antenna Technology", Recent Advances in Technologies, Intech, pp. 301-327, Nov. 1, 2009.

(Continued)

*Primary Examiner* — Valentina Xavier
(74) *Attorney, Agent, or Firm* — Nixon & Vanderhye P.C.

(57) ABSTRACT

A method for producing a satellite to facilitate the inclusion of one or more reflector antennas on a surface of the satellite is disclosed. A reusable generic configuration is determined in advance separately from the satellite mission. The generic configuration generally features the following parameters for each reflector: diameter, focal distance, offset distance of the reflector in the deployed position, position of the deployment device, position of the radiofrequency source. The generic configuration is determined such that an antenna points by default towards the centre of the earth when its reflector is in a deployed position. A specific configuration step then consists of defining a limited number of specific parameters depending on the satellite mission. The specific configuration is rendered possible in particular by controlling the deployment device, i.e., by changing the direction in (Continued)

Figure 1:
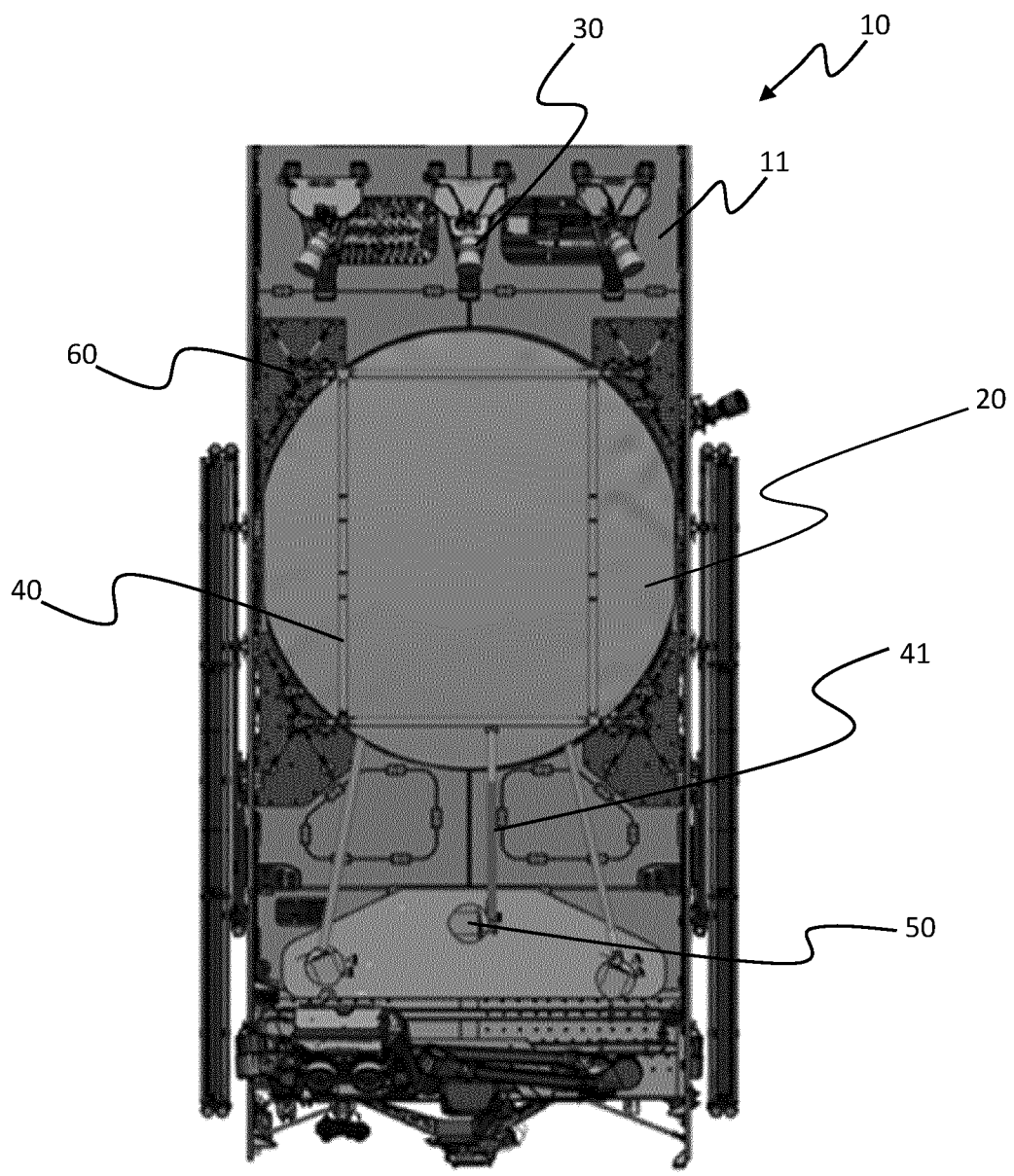

which the antenna points, once the reflector has been deployed.

13 Claims, 13 Drawing Sheets

(51) Int. Cl.
    *H01Q 15/16*     (2006.01)
    *H01Q 1/28*     (2006.01)
    *B64G 1/66*     (2006.01)

(56) References Cited

OTHER PUBLICATIONS

Han, C. C. et al., "Chapter 21: Satellite Antennas", Antenna Handbook, vol. 3—Applications, pp. 21/1-21/113, Jan. 1, 1993.
International Search Report with English Translation for PCT/EP2021/055290, dated May 14, 2021 (6 pages).
French Written Opinion of the ISA for PCT/EP2021/055290, dated May 14, 2021 (13 pages).
French International Preliminary Report on Patentability for PCT/EP2021/055290, dated Jan. 17, 2022 (9 pages).

* cited by examiner

METHOD FOR PRODUCING A SATELLITE FROM A GENERIC CONFIGURATION OF ANTENNA ELEMENTS

CROSS REFERENCE TO RELATED APPLICATIONS

The present application is a National Phase of International Application Number PCT/EP2021/055290 filed Mar. 3, 2021, which designated the U.S. and claims priority benefits from French Application Number FR2002186 filed Mar. 4, 2020, the entire contents of each of which are hereby incorporated by reference.

FIELD OF THE INVENTION

The present invention belongs to the field of communication or observation satellites carrying parabolic reflector antennas on a face of the satellite. The invention relates in particular to a manufacturing method allowing to facilitate the integration of the antennas on the satellite during the design of the satellite.

PRIOR ART

A communication or observation satellite is generally placed in orbit around the Earth to carry out a specific mission associated with one or more geographic zones on the surface of the Earth. To carry out its mission, the satellite includes one or more antennas that generally each include a radiofrequency source for emission or for reception, a reflector with specific geometric parameters (diameter, focal distance, profile, etc.), a support structure for the reflector, devices for holding and for releasing the reflector and a device for deploying the reflector.

The conventional methods for manufacturing a satellite to carry out a specific mission generally include a relatively tedious step of determining the parameters of the various antennas of the satellite to cover the various geographic zones of the mission of the satellite. This step involves for example determining for each antenna, according to the geographic zone that must be covered by the antenna, the diameter of the reflector of the antenna, its focal distance, the position of the radiofrequency source(s) of the antenna, the dimensions of the support structure of the reflector, the position of the devices for holding and for releasing the reflector, the position of the deployment device, the shape of the profile of the reflector, etc.

Technical constraints relative to the structure of the satellite can affect the determination of these parameters. Moreover, modifications made to a specific parameter affect the other parameters, and it is generally necessary to proceed by trial and error with a large number of iterations to obtain a set of parameters suitable and compatible with each other to satisfy the needs of the mission.

The number of antennas on board a satellite tends to increase. Thus, the phase of integrating the antennas onto the satellite is particularly long and costly. This integration phase is often part of the critical path of the manufacturing of the satellite. Indeed, for each new satellite to be manufactured, it is necessary to redefine all of the parameters of each antenna according to the mission of the satellite.

The document Modern Communication Satellite Antenna Technology (A. Ghulam) describes in detail the various parameters of the antenna system of a satellite that should be defined during the manufacturing of the satellite in order for the latter to be able to carry out a specific mission. This document also describes various software tools for assisting in the determination of these parameters.

When the mission of a satellite is associated with several different geographic zones on the surface of the Earth, the deployment device can be controlled (this is called "steering") to move the reflector in order to aim it at various geographic zones of interest. The patent application US 2002/135532 A1 discloses such a deployment device allowing to adjust the position of a reflector. In such a case, the parameters of the antenna must be defined in such a way that the antenna allow to satisfy the mission for each geographic zone of interest. A compromise must thus be found since the antenna is not therefore optimised for a single specific position of the reflector but for several positions corresponding to the various geographic zones of interest.

DISCLOSURE OF THE INVENTION

The goal of the present invention is to overcome all or a part of the disadvantages of the prior art, in particular those disclosed above, by proposing a solution that facilitates the phase of integration of the antennas during the manufacturing of a satellite.

For this purpose, and according to a first aspect, the present invention proposes a method for manufacturing an artificial satellite intended to be placed in orbit around the Earth to carry out a mission associated with one or more geographic zones on the surface of the Earth. The satellite comprises one or more reflectors on a face of the satellite. Each reflector is connected to said face of the satellite via a deployment device allowing to make the reflector go from a retracted position to a deployed position. When there are several reflectors, the reflectors are stacked above one another facing the face of the satellite when the reflectors are in the retracted position. Each reflector is associated with a radiofrequency source for emission or for reception to form a radio beam carrying a radio signal to or from a geographic zone on the surface of the Earth.

The manufacturing method comprises first of all a preliminary step of determining a generic configuration, independently of the mission of the satellite (that is to say independently of the geographic zone(s) associated with the mission of the satellite), by setting at least the following parameters for each reflector:
  diameter of the reflector,
  focal distance of the reflector,
  offset distance of the reflector when the reflector is in the deployed position,
  position of the deployment device on the face of the satellite,
  position of the source associated with said reflector on the face of the satellite, in such a way that a beam coming from the source is aimed at the centre of the Earth when the satellite is in orbit and the reflector is in the deployed position.

The manufacturing method then comprises a specific configuration step, according to the mission of the satellite (that is to say according to the geographic zone(s) associated with the mission of the satellite). The specific configuration step comprises the following substeps for each reflector:
  determining an adjusted deployed position of the reflector obtained by controlling the deployment device, so that a beam coming from the source is aimed at a geographic zone of the mission of the satellite when the satellite is in orbit and the reflector is in the adjusted deployed position, shaping the surface of the reflector according to said geographic zone and according to the adjusted deployed position thus determined.

The specific configuration step is implemented without modifying the parameters set during the preliminary step of determining the generic configuration.

In other words, the method for manufacturing a satellite according to the invention involves reusing a generic configuration that was defined independently of a specific mission, and defining a limited number of specific parameters according to the specific mission of the satellite. The generic configuration is determined in such a way that each antenna is aimed by default at the centre of the Earth. The specific configuration is then made possible by controlling (steering) the deployment device, that is to say by a modification of the aiming of the antenna once the reflector is deployed. The generic configuration can be reused for each new satellite to be manufactured. Only the specific configuration must be redefined for a new satellite to be manufactured.

For the generic configuration, the "deployed position" of a reflector corresponds to a "default deployed position" defined in such a way that the reflector is aimed at the centre of the Earth. For the specific configuration, the "adjusted deployed position" corresponds to a deployed position different than the default deployed position. When the reflector is in the adjusted deployed position, the reflector is aimed at a specific geographic zone on the surface of the Earth to carry out a specific mission.

In specific embodiments, the invention can further include one or more of the following features, taken alone or according to all the technically possible combinations.

In specific embodiments, each reflector is associated with holding and releasing devices comprising a portion detachable on command and allowing to hold the reflector in the retracted position during a phase of launch of the satellite and release the reflector into the deployed position once the satellite is in orbit. The preliminary step of determining a generic configuration also comprises setting, for each reflector, the position of the holding and releasing devices on the face of the satellite.

In specific embodiments, the face includes at least two reflectors.

In specific embodiments, the reflectors share the same holding and releasing devices. The method according to the invention is indeed particularly well adapted in such a case.

In specific embodiments, the reflectors all have a diameter between 220 and 270 centimetres.

In specific embodiments, the specific configuration is optimised by iterating several times the substeps of determining an adjusted deployed position and shaping the surface of the reflector.

According to a second aspect, the present invention proposes a face for manufacturing a satellite according to a manufacturing method according to any one of the above embodiments. The face includes one or more reflectors, each reflector being connected to said face of the satellite via a deployment device allowing to make the reflector go from a retracted position to a deployed position. The reflectors are stacked above one another facing the face of the satellite when the reflectors are in the retracted position. For each reflector, the face also includes a radiofrequency source for emission or for reception for forming a beam carrying a radio signal to or from the Earth. Each reflector, each source and each deployment device are arranged so that a beam coming from a source is aimed at the centre of the Earth when the satellite is in orbit and the reflector is in a default deployed position. The deployment device is further configured to move each reflector into an adjusted deployed position in which the reflector is aimed at a specific geographic zone corresponding to a mission of the satellite.

Such a face meets the requirements of a generic configuration of the manufacturing method according to the invention. To finalise the phase of integration of the antennas during the manufacturing of a satellite intended to carry out a specific mission associated with one or more geographic zone(s) on the surface of the Earth, all that remains to do is therefore to determine for each reflector an adjusted deployed position, and shape the surface of the reflector, in such a way that a beam coming from the source associated with said reflector covers a specific geographic zone of the mission of the satellite.

In specific embodiments, the invention can further include one or more of the following features, taken alone or according to all the technically possible combinations.

In specific embodiments, the face includes between one and three reflectors, each reflector satisfying one of the following sets of parameters (each set of parameters include a diameter of the reflector, a focal distance of the reflector, and an offset distance measured between the vertex of a paraboloid in which the reflector is inscribed and the tip of the reflector closest to said vertex):

diameter between 220 and 270 centimetres, focal distance between 380 and 420 centimetres, offset distance between 65 and 105 centimetres, diameter between 220 and 270 centimetres, focal distance between 358 and 398 centimetres, offset distance between 90 and 130 centimetres, diameter between 220 and 270 centimetres, focal distance between 375 and 415 centimetres, offset distance between 90 and 130 centimetres.

In specific embodiments, the face includes at least two reflectors.

In specific embodiments, the face includes several reflectors. The face further includes holding and releasing devices comprising a portion detachable on command and allowing to hold the reflectors in the retracted position during a phase of launch of the satellite, and release the reflectors into the deployed position once the satellite is in orbit. Advantageously, the various reflectors share the same holding and releasing devices.

In specific embodiments, the reflectors are concentric when the reflectors are in the retracted position. This means that the reflectors are "substantially" concentric, that is to say for example that the distance projected onto the face of the satellite between the centres of two reflectors is less than 10% of the smallest of the diameters of the reflectors, or even less than 5% of the smallest of the diameters of the reflectors.

In specific embodiments, the sources and/or the deployment devices are aligned according to a transverse axis of the face. This means that these elements are "substantially" aligned, that is to say for example that the projected distance between two elements according to an axis orthogonal to said transverse axis is less than 20 cm, or even less than 10 cm.

According to a third aspect, the present invention relates to a satellite including a face according to any one of the above embodiments.

PRESENTATION OF THE DRAWINGS

Figure 2:
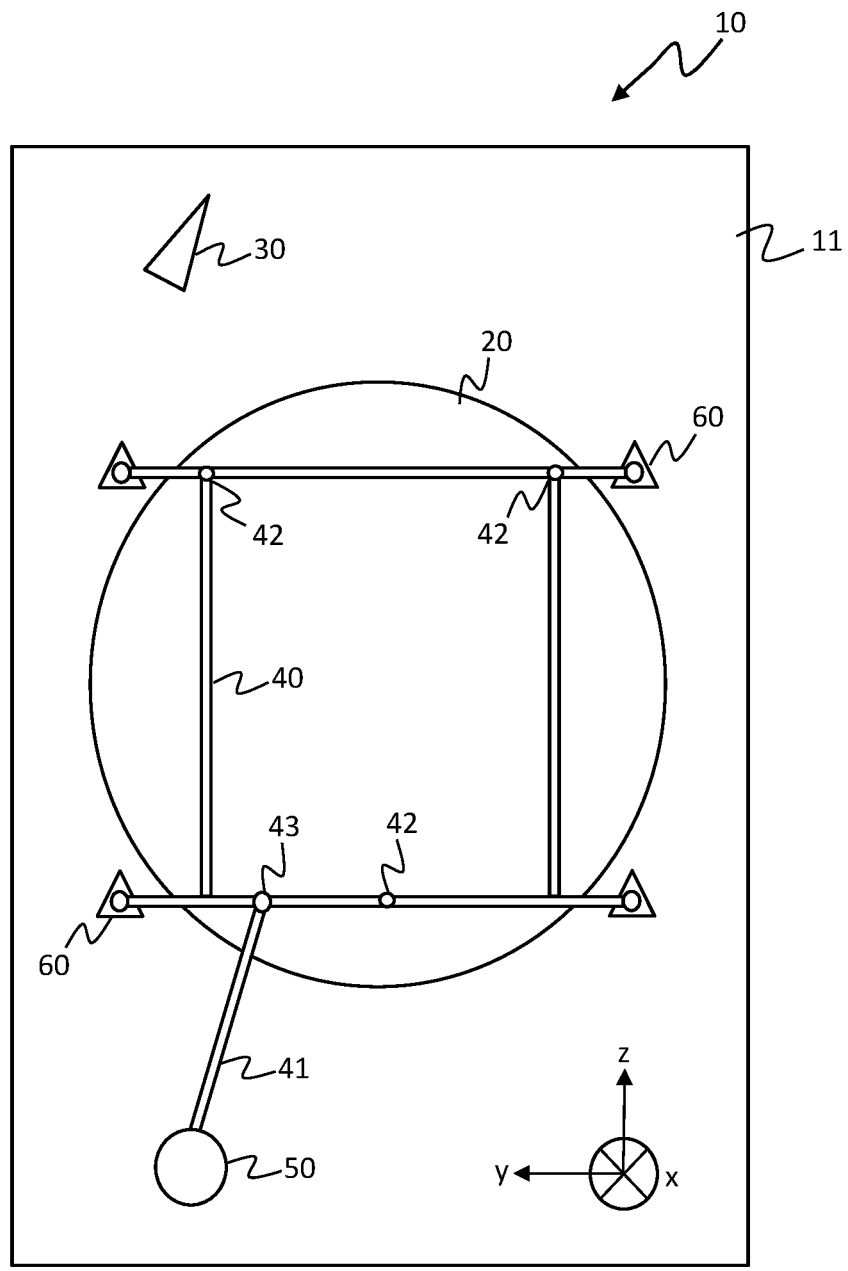
Figure 3:
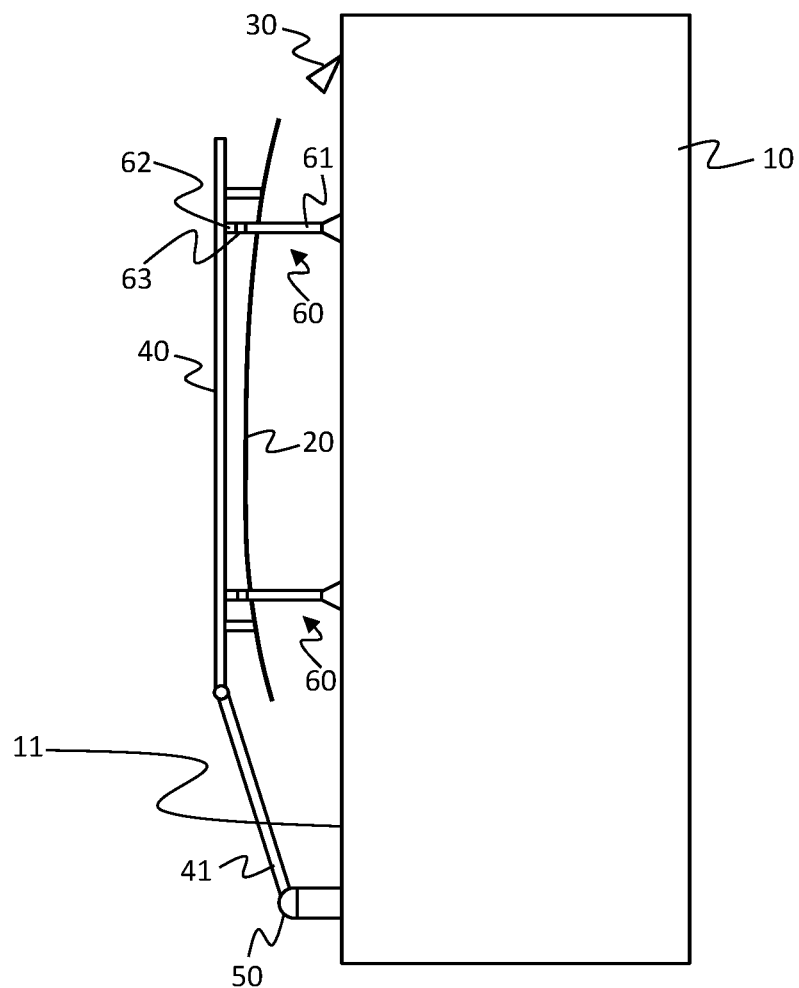
Figure 4:
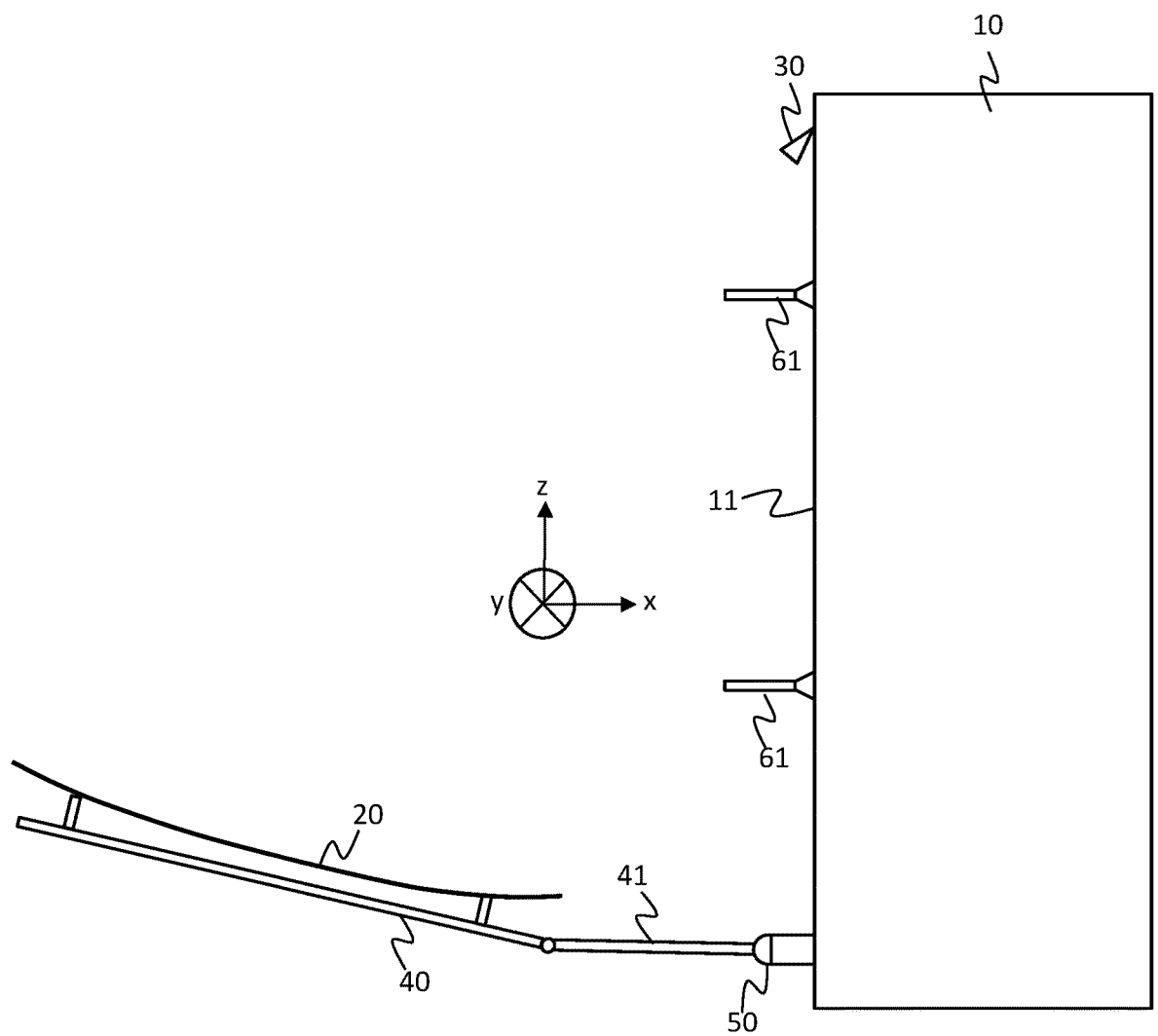
Figure 5:
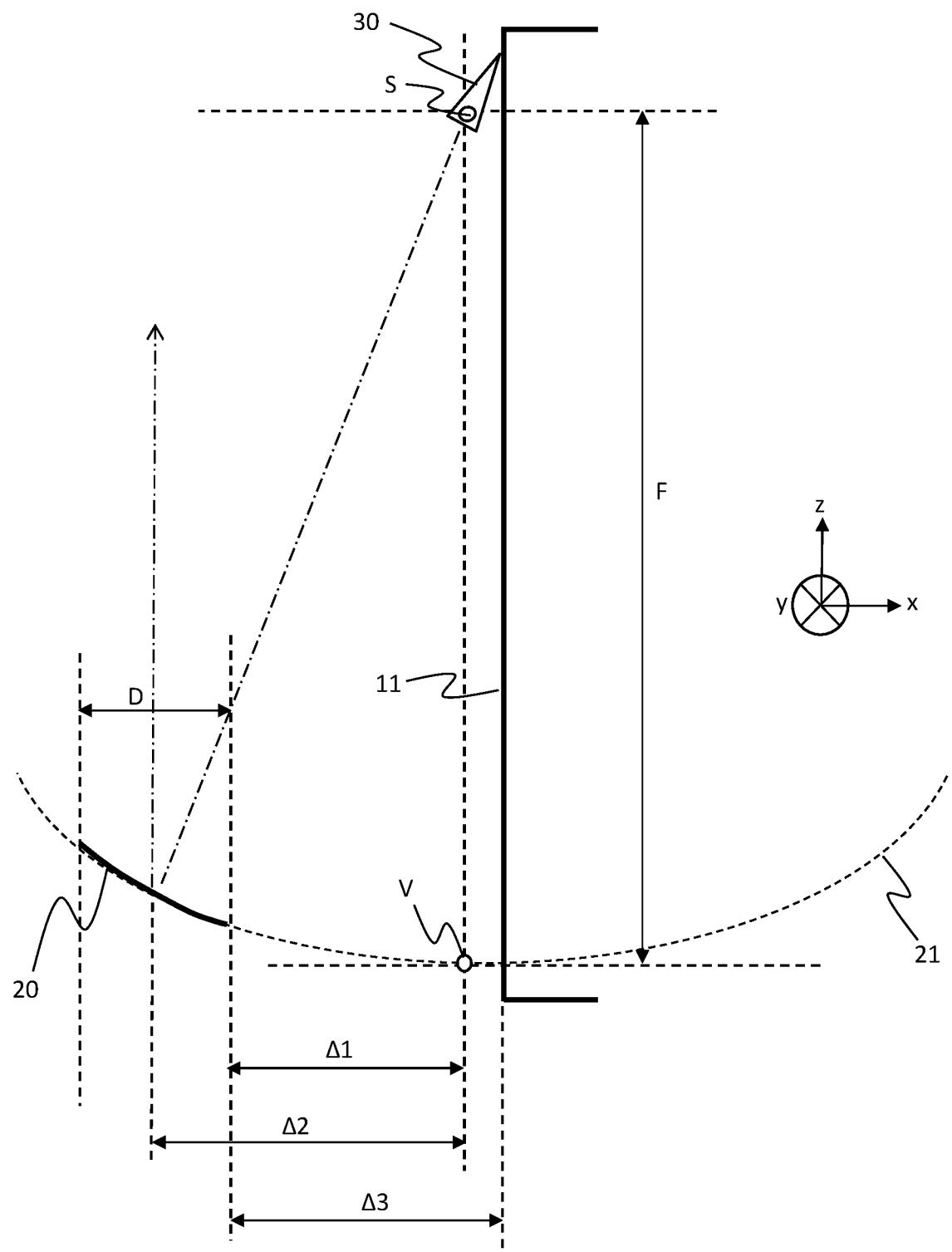
Figure 6:
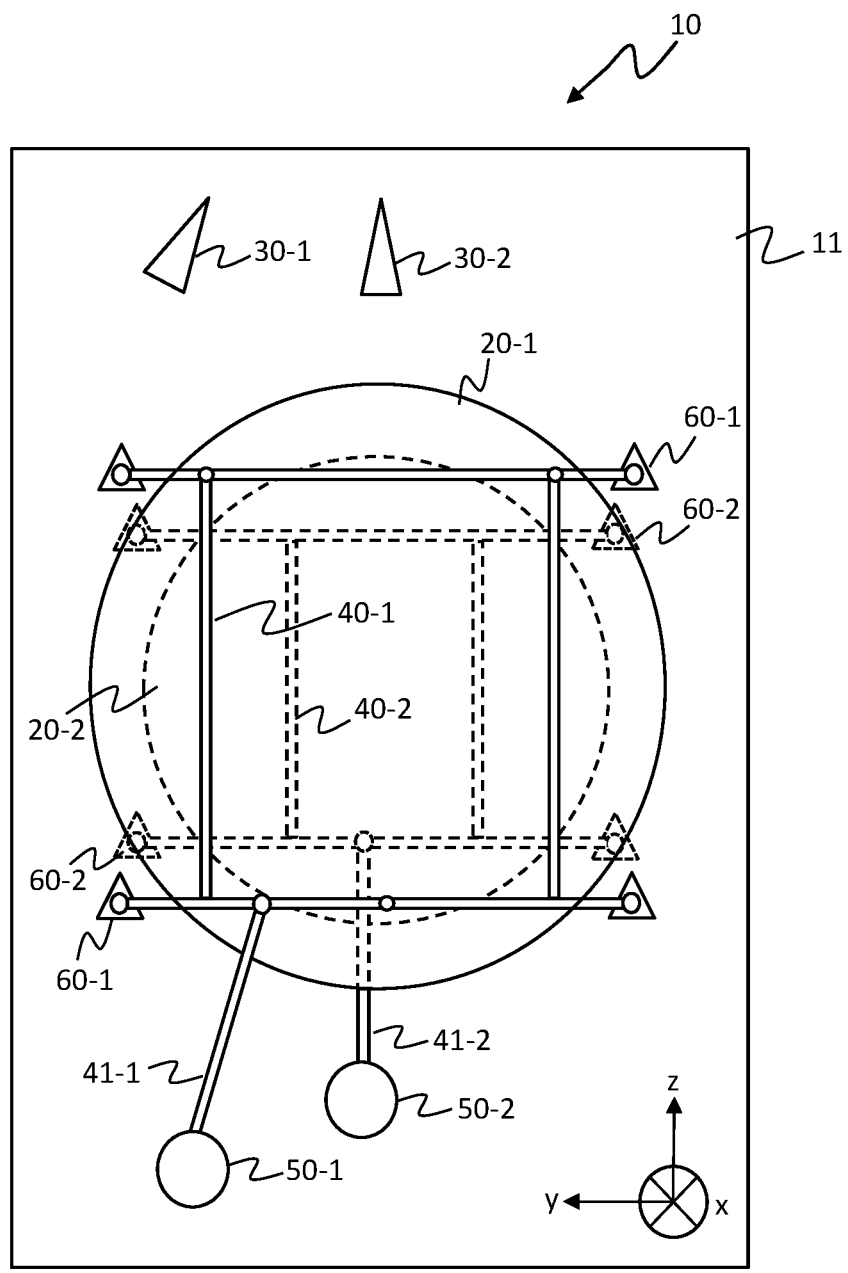
Figure 7:
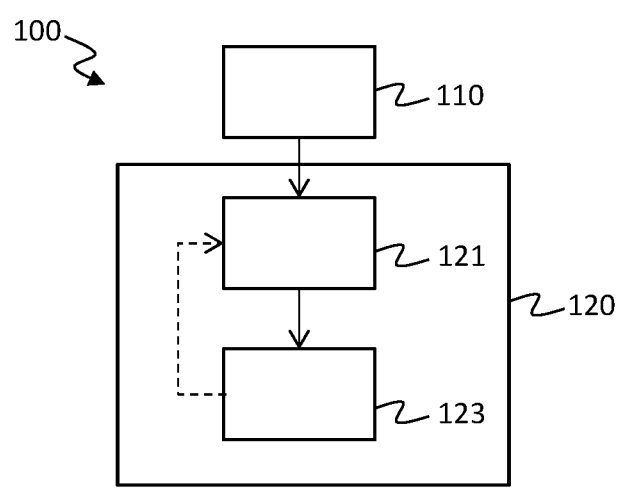
Figure 8:
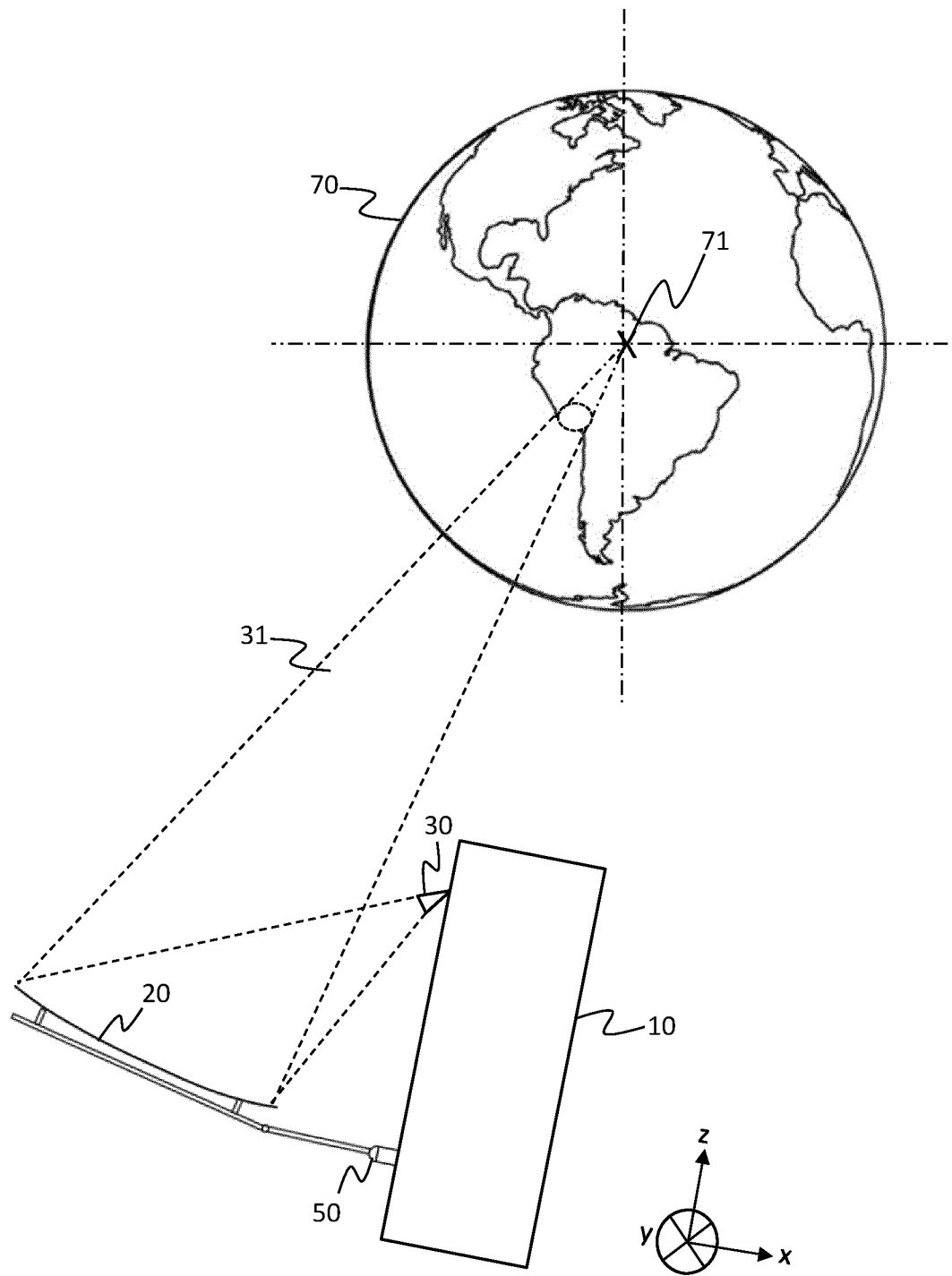
Figure 9:
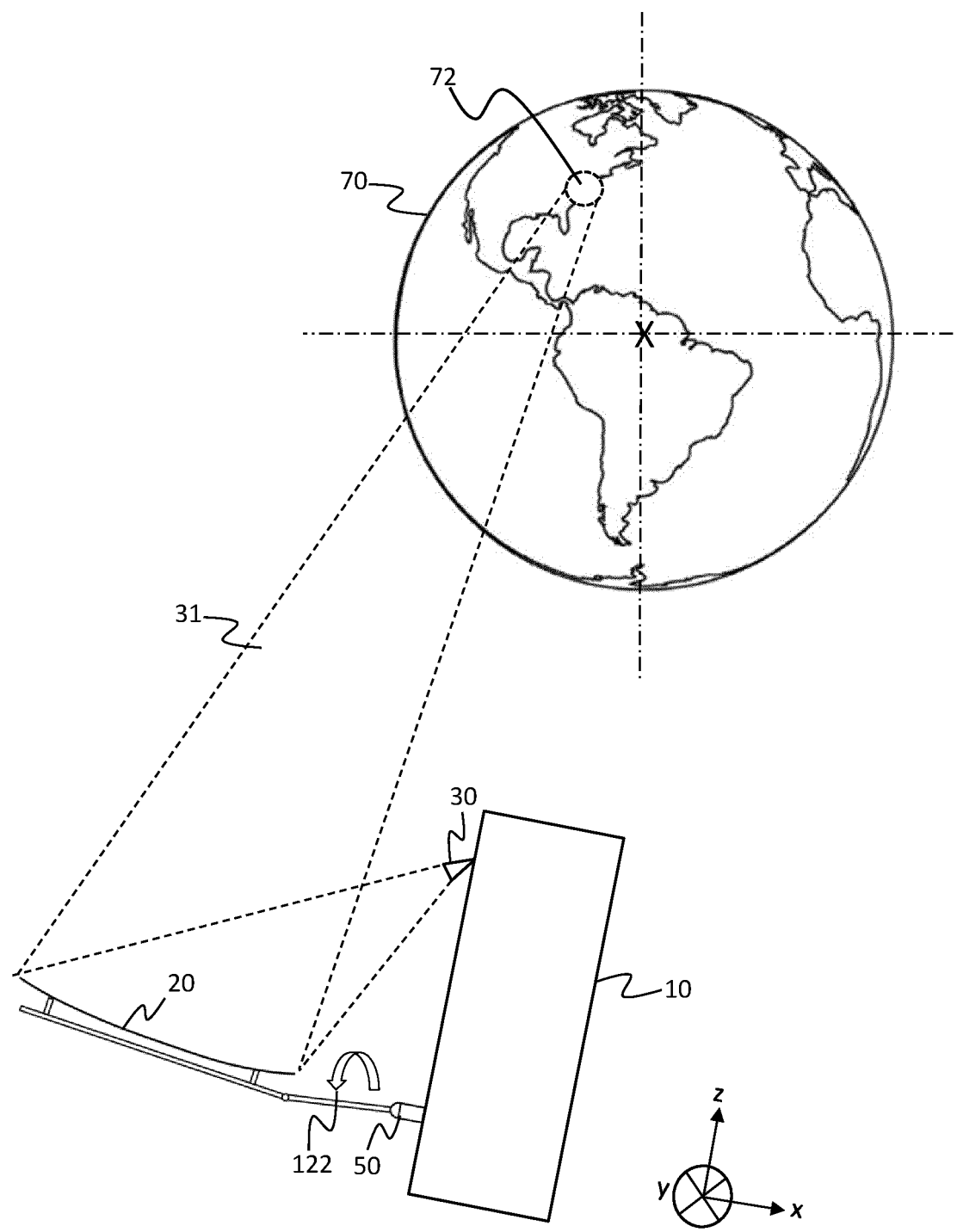
Figure 10:
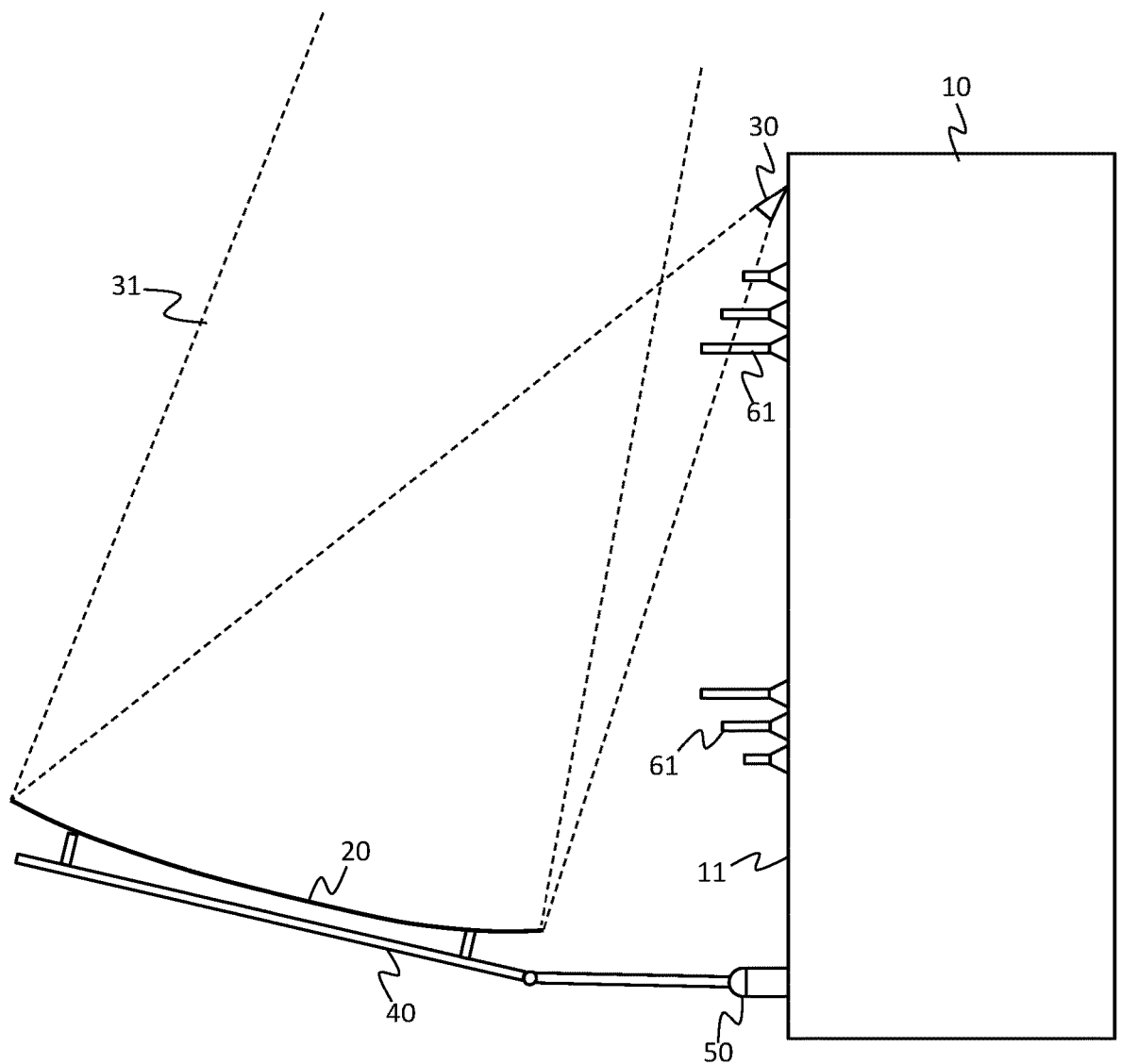
Figure 11:
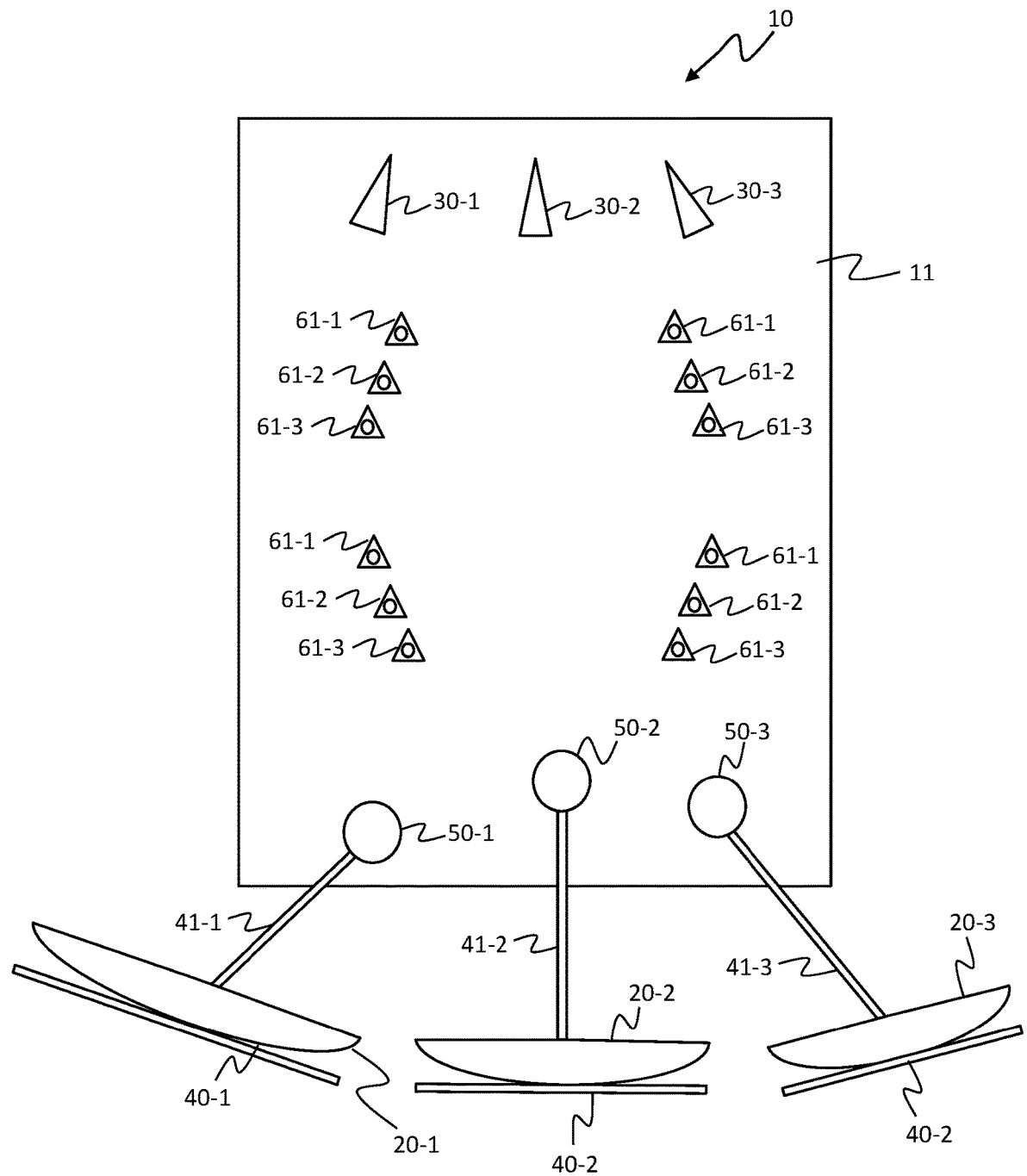
Figure 12:
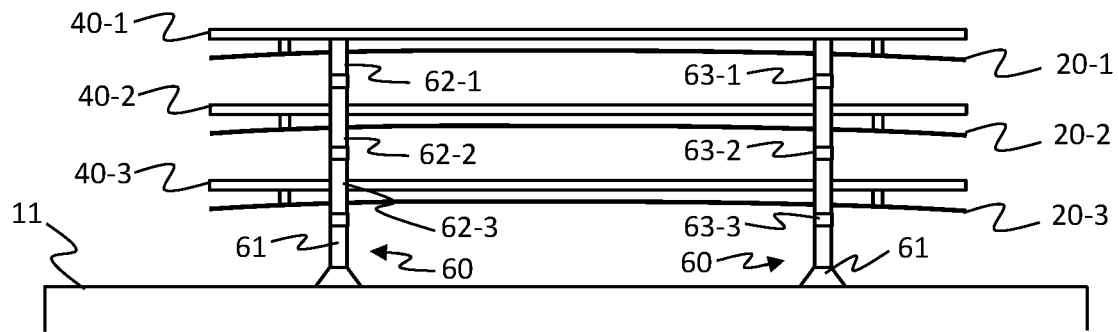
Figure 13:
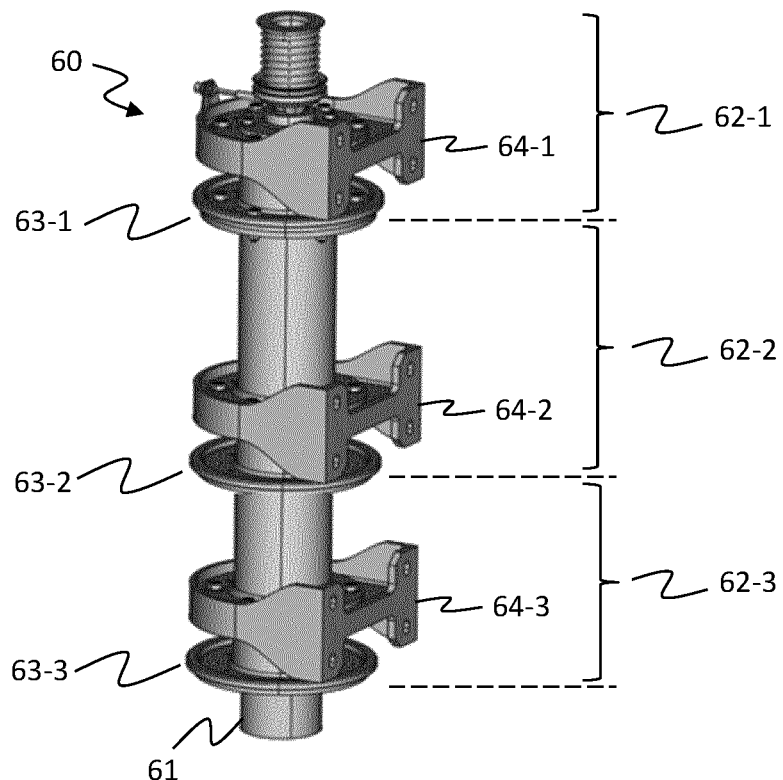
Figure 14:
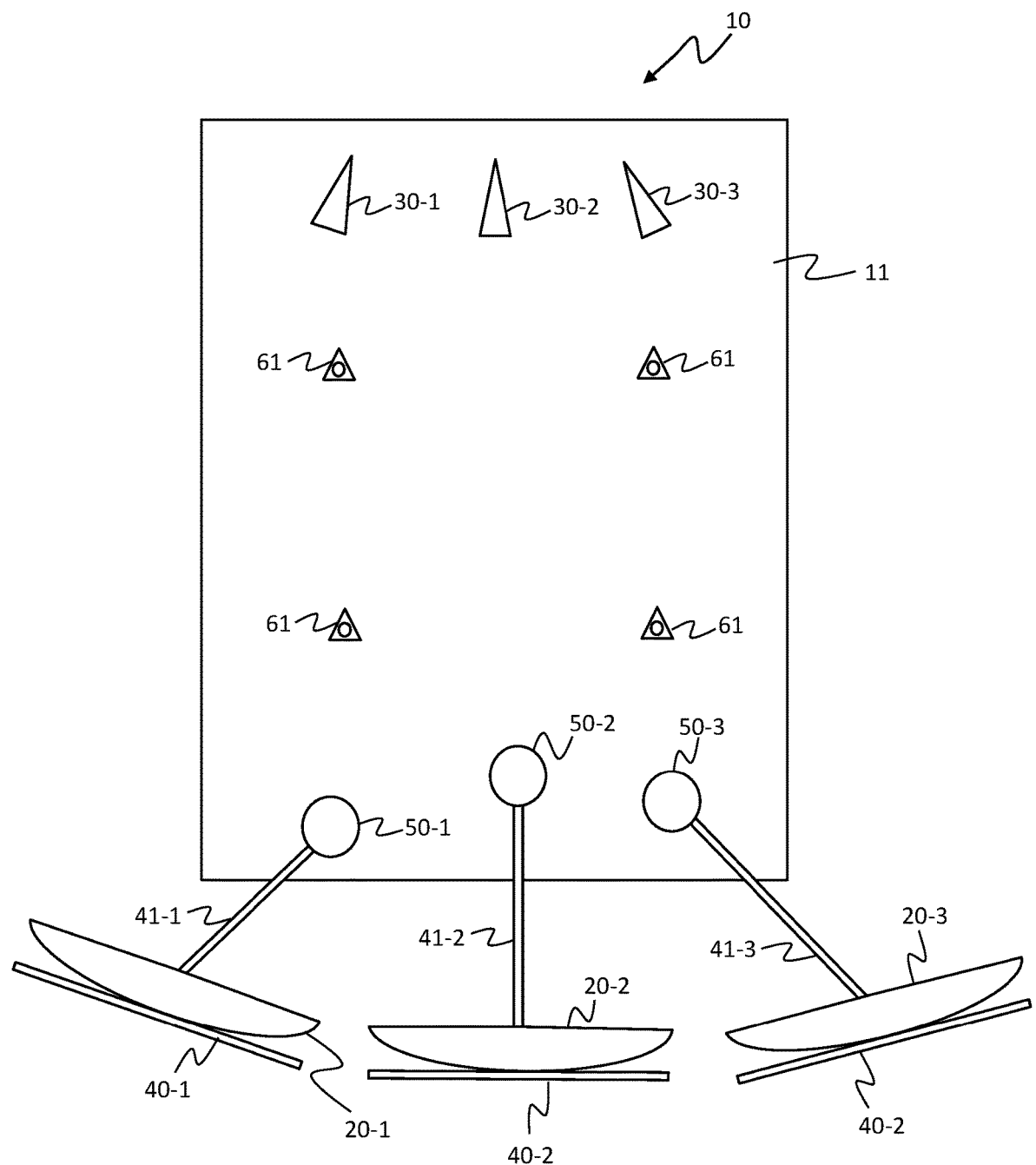

The invention will be better understood upon reading the following description, given as an example that is in no way limiting, and made in reference to FIGS. 1 to 10 which show:

FIG. 1 a representation of a face of a satellite having several reflectors stacked in the retracted position, FIG. 2 a diagram of a satellite with a reflector in the retracted position on a face of the satellite, FIG. 3 a diagram of a side view of the satellite illustrated in FIG. 2 when the reflector is in the retracted position, FIG. 4 a diagram of the satellite illustrated in FIG. 3 when the reflector is in the deployed position, FIG. 5 a diagram of the main geometric parameters for a reflector, FIG. 6 a diagram of a satellite with two reflectors stacked in the retracted position on a face of the satellite, FIG. 7 a diagram of the mains steps of a method for manufacturing a satellite according to the invention, FIG. 8 a diagram of a satellite in orbit around the Earth with a reflector in the deployed position according to a generic configuration, FIG. 9 a diagram of a satellite in orbit around the Earth with a reflector in the deployed position according to a specific configuration, FIG. 10 a diagram illustrating how the devices for holding and for releasing the reflectors of a satellite can interfere with a beam coming from a radiofrequency source of the satellite, FIG. 11 a diagram of a face of a satellite with three reflectors in the deployed position when different holding and releasing devices are used for the various reflectors, FIG. 12 a diagram of three reflectors stacked in the retracted position sharing the same holding and releasing devices, FIG. 13 a representation of a holding and releasing device intended to be associated with three different reflectors, FIG. 14 a diagram of a face of a satellite with three reflectors in the deployed position when the same holding and releasing devices are used for the various reflectors.

In these drawings, references identical from one drawing to another designate identical or analogous elements. For reasons of clarity, the elements shown are not necessarily on the same scale, unless otherwise mentioned.

DETAILED DESCRIPTION OF AN EMBODIMENT OF THE INVENTION

In the rest of the description, the case is considered of the manufacturing of a telecommunications satellite intended to be placed in geostationary orbit around the Earth. Geostationary orbit means a circular orbit around the Earth characterised by an orbital inclination of zero (the orbit is thus located in the equatorial plane) and an orbital period equal to the period of rotation of the Earth.

The satellite is placed in orbit to carry out a specific mission associated with one or more geographic zone on the surface of the Earth. The satellite includes for this purpose one or more antennas with a parabolic reflector. Each reflector is intended to cover a geographic zone of the mission of the satellite to ensure exchanges of messages by radio communication between a station located in said geographic zone on the surface of the Earth and the satellite.

FIG. 1 shows an example of a face 11 of such a satellite 10 including three reflectors 20. Each reflector is fastened to a support structure 40 connected to the face 11 of the satellite via a deployment device 50. In the example considered and illustrated in FIG. 1, the support structure 40 includes several rectilinear metal elements assembled together and arranged in the shape of a rectangle, as well as an additional rectilinear metal element acting as an arm 41 for linking with the deployment device 50. Nothing, however, prevents, in alternatives, the elements forming the support structure 40 from being curved, from being assembled in a shape other than a rectangle, and/or from being manufactured from a non-metal material (for example from carbon fibres).

The deployment device 50 (ADTM for Antenna Deployment and Trimming Mechanism) allows to make the reflector 20 go from a retracted position to a deployed position. The retracted position is the position taken up by a reflector 20 during the phase of launch of the satellite (that is to say during the take-off and the flight of the launcher of the satellite, and during the release of the satellite). In the retracted position, each reflector 20 is positioned facing the face 11 of the satellite. When there are several reflectors on the same face 11 of the satellite, as is the case in the example illustrated in FIG. 1, the reflectors are stacked above one another facing the face 11 of the satellite when they are in the retracted position. When the reflectors 20 are in the retracted position, the bulk of the satellite 10 is reduced, which is advantageous to place the satellite in a nose cone of a launcher. Moreover, when the reflectors 20 are in the retracted position, they better resist the mechanical stresses caused by the vibrations during the launch phase.

Holding and releasing devices 60 (HRM for "Hold and Release Mechanism") allow to hold the reflectors 20 in the retracted position during the phase of launch of the satellite then to release the reflectors 20 in order for them to be deployed once the satellite 10 is in orbit.

In the deployed position, a reflector is moved away from the face 11 of the satellite via the deployment device 50 and the linking arm 41 in such a way that the reflector is positioned facing the Earth. The separation of the reflector from the face 11 of the satellite can be defined by an offset distance of the reflector when the reflector is in the deployed position. This offset distance will be defined later in a more precise manner in reference to FIG. 5.

Each reflector 20 is associated with at least one radiofrequency source 30 for emission or for reception. A radiofrequency source allows to form a beam carrying a radio signal to or from the geographic zone on the surface of the Earth covered by the reflector 20. Radio signal means an electromagnetic wave, the frequency of which is lower than 300 GHz. A radiofrequency source 30 of the satellite 10 is for example adapted to emit a radio signal on a downstream link of the Ku layer (range of microwave frequencies ranging from 10.70 to 12.75 GHz) and/or to receive a radio signal on an upstream link of the Ku layer (range of microwave frequencies ranging from 12.75 to 18 GHz). According to other examples, a radiofrequency source 30 can also be adapted to emit on another frequency band for example such as one of the bands L, S, C, X, Ka, Q or V.

In the example considered, each reflector 20 is associated with a single radiofrequency source 30 for example in the form of a corrugated horn (the inside of the horn has annular machinings to improve the radiation diagram of the antenna). Each source forms a radio beam. It should be noted, however, that the invention could also be applied to an antenna of the SFPB type (acronym for Single Feed Per Beam) for which the reflector is associated with several sources, each source being associated with a radio beam, or to an antenna of the MFPB type (acronym for Multiple Feeds Per Beam) for which the reflector is associated with a network of several sources allowing to form different beams, each beam being formed by several sources of the network. In the case of an SFPB or MFPB antenna, the single radiofrequency source 30 shown in FIG. 1 would be replaced by a set of several radiofrequency sources.

FIG. 2 is a simplified diagram of a face 11 of a satellite 10 with a reflector 20 in the retracted position. The source 30 associated with the reflector 20, the support structure 40, the linking arm 41, the deployment device 50 and the devices 60 for holding and releasing the reflector 20 are also shown in FIG. 2. FIG. 2 also highlights linking points 42, for example in the form of threaded inserts, allowing to fasten the reflector 20 to the support structure 40, as well as a point 43 for linking the arm 41 with the rectangular part of the support structure 40.

The deployment device 50 allows to make the reflector 20 go from the retracted position to the deployed position once the satellite 10 is in orbit and the devices 60 for holding and releasing the reflector have released the reflector. For this purpose, the deployment device 50 allows to apply a movement of rotation to the assembly formed by the support structure 40 (including the linking arm 41) and the reflector 20 about an axis according to the direction y passing through the deployment device 50 (pitch) and about an axis according to the direction x passing through the deployment device 50 (roll). The pitch allows in particular to move the reflector 20 away from the face 11 of the satellite in order for the reflector 20 to be positioned facing the Earth. The pitch and roll movements also allow to orient the reflector 20 to aim at a specific geographic zone on the surface of the Earth. In the example considered, when the satellite is in orbit around the Earth, the direction z is aimed at the centre of the Earth, the direction x is aimed east and the direction y is aimed south. The face 11 shown in FIG. 2 thus corresponds to the western face of the satellite.

FIG. 3 is a diagram of a side view of the satellite 10 illustrated in FIG. 2 when the reflector 20 is in the retracted position. In the example illustrated in FIG. 3, each device 60 for holding and releasing the reflector 20 includes a base 61 and a portion 62 detachable on command. The base 61 of the device 60 for holding and releasing the reflector 20 is fastened to the face 11 of the satellite 10. The detachable portion 62 connects the support structure 40 of the reflector 20 to the base 61 of the holding and releasing device 60 via a pyrotechnic element 63. When the pyrotechnic element 63 is actuated on command, the detachable portion 62 is disconnected from the base 61 of the holding and releasing device 60. To deploy the reflector 20, the pyrotechnic elements 63 of the various devices 60 for holding and releasing the reflector 20 are actuated at the same time to release the reflector 20. Other mechanisms are possible to detach the detachable portion 62. For example, non-explosive mechanisms could be used to control the separation of the detachable portion 62 from the base 61 of the holding and releasing device 60. The choice of a specific type of devices 60 for holding and releasing the reflector 20 merely corresponds to an alternative of the invention.

FIG. 4 is a diagram of a side view of the satellite 10 illustrated in FIG. 2 when the reflector 20 is in the deployed position. To be thus positioned, the deployment device 50 applied to the arm 41 a movement of rotation about an axis according to the direction y and passing through the deployment device 50. The arm 41 thus drove the support structure 40 and the reflector 20 into a deployed position, separated from the face 11 of the satellite, in order for the reflector 20 to be positioned facing the Earth. The bases 61 of the devices 60 for holding and releasing the reflector 20, which remain fastened onto the face 11 of the satellite 10 after deployment of the reflector 20, are also shown in FIG. 4.

For reasons of simplification, FIGS. 2 to 4 only show a single reflector 20 associated with the face 11 of the satellite. It should be noted, however, that the face 11 of the satellite can include several reflectors 20. The reflectors 20 are thus stacked above each other facing the face 11 of the satellite when they are in the retracted position, and they are deployed next to each other to face the Earth once the satellite is in orbit. It should also be noted that the face of the satellite opposite to the face 11 described in reference to FIGS. 2 to 4 can also include one or more reflectors. Two opposite faces of the satellite can thus be totally or partly symmetrical. The two faces can for example be totally symmetrical if they include the same number of reflectors 20, the same reflectors, and the same elements positioned identically for each reflector (source 30, deployment device 50, holding and releasing devices 60). The two faces can be partly symmetrical for example if one face includes less reflectors than the other or if different radiofrequency sources 30 are used to operate in different frequency bands (the positions of the sources 30 can nevertheless remain symmetrical).

FIG. 5 is a diagram of the main geometric parameters for a reflector 20. As illustrated in FIG. 5, the reflective surface of the reflector 20 is inscribed in a paraboloid 21 of revolution that has as a vertex a point noted as V (vertex of the paraboloid). The focus of the paraboloid is noted as S. The source 30 associated with the reflector 20 is placed at this focal point S. The focal distance F of the reflector 20 thus corresponds to the distance between the vertex V of the paraboloid 21 and the focal point S of the paraboloid 21. The axis passing through the points S and V corresponds to the focal axis of the paraboloid 21. The diameter of the reflector 20 is noted as D. As illustrated in FIG. 5, in the present application "diameter of the reflector 20" means the diameter of the projection of the reflector in a plane orthogonal to the focal axis and passing through the vertex V. The separation of the reflector 20 from the face 11 of the satellite can be defined by an offset distance of the reflector when the reflector 20 is in the deployed position. According to a first example, the offset distance can be defined as the distance $\Delta 1$ between the vertex V of the paraboloid 21 and the point on the reflective surface of the reflector 20 that is closest to the vertex V (this distance is generally called "offset to the edge" or "clearance"). According to a second example, the offset distance can be defined as the distance $\Delta 2$ between the vertex V of the paraboloid 21 and the centre of the reflective surface of the reflector 20 (this distance is generally called "offset"). According to a third example, the offset distance can be defined as the distance $\Delta 3$ between the face 11 of the satellite and the point on the reflective surface of the reflector 20 that is closest to said face 11. It should be noted that from the moment that the position of the source 30 with respect to the face 11 is set, the distances $\Delta 1$, $\Delta 2$ and $\Delta 3$ all three allow to define the same deployed position of the reflector 20, that is to say with the same separation of the reflector 20 from the face 11 of the satellite. The manner of defining the offset distance of the reflector when the reflector is in the deployed position is not very important. Ways other than those illustrated in FIG. 5 are also possible for defining an offset distance of the reflector when the reflector is in the deployed position (for example the distance between the face 11 and the centre of the reflective surface of the reflector 20).

In order for the reflector 20 to be aimed at the centre of the Earth in the deployed position, the direction taken by a beam coming from the source 30 and reflected by the reflector 20 should be parallel to the axis z. This direction (aiming direction) is also parallel to the focal axis of the paraboloid 21 (that is to say the axis passing through the source S and the vertex V).

The position of a reflector 20 with respect to the face 11 when the reflector 20 is in the deployed position is thus completely determined when the position of the source the focal distance F and the offset distance are set. After also having set the diameter of the reflector 20 and the position of the deployment device 50, it becomes possible to define the dimensions of the support structure 40 and of the linking arm 41.

It should be noted than in the example illustrated in FIG. 5, the plane containing the beam coming from the source 30, the beam reflected by the reflector 20 and the focal axis of the paraboloid 21 is orthogonal to the face 11 of the satellite. This plane is not, however, necessarily orthogonal to the face 11 of the satellite.

FIG. 6 is a diagram of a face 11 of a satellite 10 with two reflectors 20-1, 20-2 stacked in the retracted position. The elements associated with the first reflector 20-1 are shown with solid lines: support structure 40-1, linking arm 41-1, holding and releasing devices 60-1, deployment device 50-1, radiofrequency source 30-1. The elements associated with the second reflector 20-2 are shown with dotted lines: support structure 40-2, linking arm 41-2, holding and releasing devices 60-2, deployment device radiofrequency source 30-2. In the example illustrated in FIG. 6, the first reflector is stacked above the second reflector 20-2 when the reflectors 20-1, 20-2 are in the retracted position. In the example illustrated in FIG. 6, the first reflector 20-1 has a greater diameter than the second reflector 20-2. Nothing prevents, however, all the reflectors from having the same diameter.

FIG. 7 schematically illustrates the main steps of the method 100 for manufacturing a satellite 10 according to the invention.

The manufacturing method 100 comprises first of all a preliminary step of determining 110 a generic configuration, independently of the mission of the satellite, that is to say independently of the geographic zone(s) associated with the mission of the satellite, by setting at least the following parameters for each reflector 20 associated with a face 11 of the satellite 10:
 diameter of the reflector 20,
 focal distance of the reflector 20,
 offset distance of the reflector 20 when the reflector 20 is in the deployed position,
 position of the deployment device 50 on the face 11 of the satellite 10,
 position of the source 30 associated with said reflector 20 on the face 11 of the satellite 10.

The various aforementioned parameters are determined in such a way that a beam coming from the source 30 is aimed at the centre of the Earth when the reflector 20 is in the deployed position.

The manufacturing method then comprises a specific configuration step 120, according to the mission of the satellite, that is to say according to the geographic zone(s) associated with the mission of the satellite. The specific configuration step 120 comprises the following substeps for each reflector 20:
 determining 121 an adjusted deployed position of the reflector 20 obtained by controlling the deployment device 50, so that a beam coming from the source 30 is aimed at a specific geographic zone of the mission of the satellite,
 shaping 123 the surface of the reflector 20 according to the geographic zone to be covered and according to the adjusted deployed position thus determined.

It is important to note that the specific configuration step is implemented without modifying the parameters set during the preliminary step of determining 110 the generic configuration.

In other words, the method 100 for manufacturing a satellite 10 according to the invention involves reusing a generic configuration that was defined independently of a specific mission, and defining a limited number of specific parameters according to the specific mission of the satellite. The generic configuration is determined in such a way that each antenna is aimed by default at the centre of the Earth. The specific configuration is then made possible by controlling the deployment device, that is to say by a modification of the aiming of the antenna once the reflector is deployed. The generic configuration can be reused for each new satellite to be manufactured, and for each face of the satellite that must include reflector antennas. Only the specific configuration must be redefined for a new satellite to be manufactured and/or for each face of the satellite.

The manufacturing method 100 according to the invention is made possible by the use of a deployment device 50 that has a steering margin in terms of pitch and roll sufficient to be able to orient each reflector 20, starting from the default deployed position, to be aimed at any geographic zone on the surface of the Earth that is visible by the satellite 10 once the satellite is in orbit.

FIG. 8 schematically illustrates a satellite 10 in orbit around the Earth 70 with a reflector 20 in the deployed position according to a generic configuration. As illustrated in FIG. 8, the generic configuration is determined so that a beam 31 coming from the radiofrequency source 30 associated with the reflector 20 is aimed at the centre 71 of the Earth 70 when the reflector 20 is in the default deployed position. As illustrated in FIG. 8, the beam 31 is reflected by the reflector 20 to be directed towards the Earth 70.

In the generic configuration, the default deployed position of a reflector 20 is therefore defined by the pitch angle and the roll angle that the deployment device 50 must apply to place the reflector 20 in a position such that a beam 31 coming from the radiofrequency source 30 associated with the reflector 20 is aimed at the centre 71 of the Earth 70.

FIG. 9 highlights the step of controlling 122 the deployment device 50 of the reflector 20 to place the reflector 20 in an adjusted deployed position. During this step, an additional movement of pitch and/or roll is applied by the deployment device 50 to the linking arm 41 to place the reflector 20 in a position for which a beam 31 coming from the radiofrequency source 30 and reflected by the reflector 20 covers a specific geographic zone 72 belonging to the mission of the satellite.

The adjusted deployed position of a reflector 20 determined during the specific configuration step 120 is thus defined by the pitch angle and the roll angle that the deployment device 50 must apply to place the reflector 20 in a position such that a beam 31 coming from the radiofrequency source 30 associated with the reflector 20 is aimed at a specific geographic zone 72 after reflection on the reflector 20.

The substep of shaping 123 the reflector 20 during the specific configuration step 120 allows to optimise the contour of the zone covered by the beam 31 to best cover the geographic zone 72. As illustrated in FIG. 7, the substeps of determining 121 an adjusted deployed position and of shaping 123 the surface of the reflector can be iterated several times during the phase of specific configuration to optimise the performance of the antenna.

It should be noted that the substep of shaping 123 is not absolutely indispensable to the invention (in particular if the invention is applied to antennas of the SFPB or MFPB type). However, this substep of shaping 123 is particularly advantageous since it allows to compensate for the fact that the antenna was initially designed to be aimed by default at the centre 71 of the Earth 72, and not at a specific geographic zone 72.

The number of parameters to be defined for the specific configuration is very limited compared to the conventional methods for which the set of all the parameters relative to all the elements present on the face of the satellite must be defined. Reusing the generic configuration thus allows to facilitate the phase of integration of the antennas during the manufacturing of the satellite.

The diameter and the focal distance of each reflector 20 are set by the generic configuration. It is advantageous to provide a generic configuration with reflectors having a relatively large diameter. There will thus be more flexibility in the choice of the missions that could be carried out by a satellite manufactured from this generic configuration. A reflector with a large diameter can indeed be used to cover geographic zones for which a reflector with a smaller diameter would have sufficed. In preferred embodiments, the reflectors 20 have a diameter between 220 and 270 centimetres.

Setting the position of the radiofrequency sources 30 on the face 11 in the generic configuration allows to standardise the position of the various interfaces with these sources 30 in the satellite (waveguides, devices for fastening the sources, etc.).

Setting the position of the deployment devices 50 on the face 11 in the generic configuration is also advantageous since the study of the technical constraints relative to the position of these devices on the satellite will only need to be done once (and no longer every time a new satellite is manufactured).

In specific embodiments, the positions of the various devices 60 for holding and releasing the reflectors 20 are also set in the generic configuration.

The position of the devices 60 for holding and releasing the reflectors 20 can have an impact on the performance of the radiofrequency sources 30. As illustrated in FIG. 10, once the reflectors 20 are deployed, the bases 61 of the holding and releasing devices 60 fastened onto the face 11 of the satellite 10 can be located at least partly inside a radio beam 31 coming from a radiofrequency source 30 and cause interference. This is why it is generally necessary, during the design of the satellite, to carry out a study of the effect of these holding and releasing devices 60 on a radio signal emitted by a source 30, and take the necessary measures to compensate for this effect in the radio transmission or reception chain. Here again, by setting the position of the various elements in the generic configuration, this study will only need to be done once, and no longer every time a new satellite is designed.

It is advantageous to reduce the number of the holding and releasing devices 60 to limit their effect on a radio signal emitted by a radiofrequency source 30. In the example illustrated in FIG. 10, there are four holding and releasing devices 60 for each reflector 20. Since there are three reflectors in the example considered, this makes a total of twelve holding and releasing devices 60 on the face 11 of the satellite.

FIG. 11 schematically shows a face 11 of a satellite 10 with three reflectors 20-2, 20-3 in the deployed position when different holding and releasing devices are used for the various reflectors. As illustrated in FIG. 11, after deployment there remains on the face 11 the bases 61-1 of four holding and releasing devices associated with the first reflector 20-1, the bases 61-2 of four other holding and releasing devices associated with the second reflector 20-2, and the bases 61-3 of four more other holding and releasing devices associated with the third reflector 20-3.

In specific embodiments, and as illustrated in FIG. 12, the reflectors 20 share the same holding and releasing devices 60. FIG. 12 shows three reflectors 20-1, 20-2, 20-3 stacked in the retracted position on a face 11 of the satellite 10. The three reflectors share the same holding and releasing devices 60. Thus, only four holding and releasing devices 60 are necessary for the three reflectors 20-1, 20-2, 20-3. For this purpose, each holding and releasing device 60 includes for example three detachable parts 62-1, 62-2, 62-3 and three pyrotechnic elements 63-1, 63-2, 63-3. To deploy the reflectors, the first pyrotechnic element 63-1 of each holding and releasing device 60 is activated, which allows to detach the first detachable part 62-1 of each holding and releasing device 60 to release the first reflector 20-1. Then, the second pyrotechnic element 63-2 of each holding and releasing device 60 is activated, which allows to detach the second detachable part 62-2 of each holding and releasing device 60 to release the second reflector 20-2. Finally, the third pyrotechnic element 63-3 of each holding and releasing device 60 is activated, which allows to detach the third detachable part 62-3 of each holding and releasing device 60 to release the third reflector 20-3. With such arrangements, only four holding and releasing devices 60 are necessary for all three reflectors 20-1, 20-2, 20-3.

FIG. 13 shows an example of a holding and releasing device 60 intended to be associated with three different reflectors. As illustrated in FIG. 13, each detachable part 62-1, 62-2, 62-3 respectively includes a fastening element 64-1, 64-2, 64-3 to fasten the detachable part to the associated reflector. In the example illustrated in FIG. 13, a fastening element 64-1, 64-2, 64-3 includes a metal surface with holes to receive for example bolts or rivets. The base 61 of the holding and releasing device 60 is intended to be fastened onto the face 11 of the satellite.

FIG. 14 schematically shows the satellite face 11 described in reference to FIG. 12 when the three reflectors 20-1, 20-2, 20-3 are in the deployed position. After deployment, there remains on the face 11 only the bases 61 of four holding and releasing devices associated with the three reflectors 20-1, 20-2 and 20-3.

It should be noted that in the example illustrated in FIGS. 12 and 14, the various reflectors 20-1, 20-2, 20-3 have substantially the same diameter. Nothing prevents, however, reflectors having different diameters from being able to still share the same holding and releasing devices. In such a case, the support structures associated with the various reflectors have for example different dimensions to be able to be attached to the fastening elements 64-1, 64-2, 64-3 of the holding and releasing devices 60 shared among the various reflectors.

The method 100 according to the invention is particularly well adapted to obtain a configuration in which the reflectors share the same holding and releasing devices, and/or in which the reflectors are concentric when they are in the retracted position (as illustrated in FIG. 6), and/or in which the sources are aligned (as illustrated in FIGS. 1, 6, 11 and 14), and/or in which the deployment devices are aligned.

The above description clearly illustrates that, via its various features and their advantages, the present invention achieves the goals set by proposing a method that facilitates the phase of integration of the antennas during the design of a satellite.

In general, it should be noted that the embodiments and implementations considered above have been described as non-limiting examples, and that other alternatives are consequently possible.

In particular, the choice of the number of reflectors 20 arranged on a face 11 of the satellite, the choice of a specific shape for the support structure 40 of a reflector 20, the choice of the number and/or of the type of devices 60 for holding and releasing a reflector 20, the choice of a specific type of radiofrequency source 30 or of deployment devices 50 are merely alternatives of the invention.

The invention has been described while considering the manufacturing of a telecommunication satellite intended to be placed in geostationary orbit around the Earth. Nothing excludes, however, according to other examples, applying the present invention to the manufacturing of another type of satellite, optionally intended to be placed in non-geostationary orbit, or even in orbit around a celestial body other than the Earth.

The invention claimed is:

1. A for manufacturing a satellite intended to be placed in geostationary orbit around the Earth to carry out a mission associated with one or more geographic zones on the surface of the Earth, said satellite comprising one or more reflectors on a face of the satellite, each reflector being connected to said face of the satellite via a deployment device allowing to make the reflector go from a retracted position to a deployed position, the reflectors being stacked above one another facing the face of the satellite when there are several reflectors and when the reflectors are in the retracted position, each reflector being associated with a radiofrequency source for emission or for reception to form a beam carrying a radio signal to or from a geographic zone on the surface of the Earth, said manufacturing method comprising:
   a preliminary step of determining a generic configuration, independently of the mission of the satellite, by setting at least the following parameters for each reflector:
   diameter of the reflector,
   focal distance of the reflector,
   offset distance of the reflector when the reflector is in the deployed position,
   position of the deployment device on the face of the satellite,
   position of the source associated with said reflector on the face of the satellite, in such a way that a beam coming from the source is aimed at the centre of the Earth when the satellite is in orbit and the reflector is in the deployed position,
   a specific configuration step, according to the mission of the satellite, comprising the following sub-steps for each reflector:
   determining an adjusted deployed position of the reflector obtained by controlling the deployment device, so that a beam coming from the source is aimed at a geographic zone of the mission of the satellite when the satellite is in orbit and the reflector is in the adjusted deployed position,
   shaping the surface of the reflector according to said geographic zone and according to the adjusted deployed position thus determined,
   the specific configuration step being implemented without modifying the parameters set during the preliminary step of determining the generic configuration.

2. The method according to claim 1, wherein each reflector is associated with holding and releasing devices comprising a portion detachable on command and allowing to hold the reflector in the retracted position during a phase of launch of the satellite and release the reflector into the deployed position once the satellite is in orbit, and the preliminary step of determining a generic configuration also comprises setting, for each reflector, the position of the holding and releasing devices on the face of the satellite.

3. The method according claim 2, wherein the face includes at least two reflectors.

4. The method according to claim 3, wherein the various reflectors share the same holding and releasing devices.

5. The method according to claim 4, wherein the reflectors have a diameter between 220 and 270 centimetres.

6. The method according to claim 1, wherein the specific configuration is optimised by iterating several times the sub-steps of determining an adjusted deployed position and shaping the surface of the reflector.

7. A face of a satellite used for manufacturing a satellite according to the method of according to claim 1, the satellite being intended to be placed in geostationary orbit around the Earth, said facet including:
   one or more reflectors, each reflector being connected to said face of the satellite via a deployment device allowing to make the reflector go from a retracted position to a deployed position, the reflectors being stacked above one another facing the face of the satellite when there are several reflectors and when the reflectors are in the retracted position,
   for each reflector, a radiofrequency source for emission or for reception for forming a beam carrying a radio signal to or from the Earth,
   wherein each reflector, each source and each deployment device are arranged so that a beam coming from a source is aimed at the centre of the Earth when the satellite is in orbit and the associated reflector is in a default deployed position,
   wherein each deployment device is configured to move each reflector into an adjusted deployed position in which the reflector, is aimed at a specific geographic zone corresponding to a mission of the satellite.

8. The face as claimed in claim 7, including between one and three reflectors, each reflector satisfying one of the following sets of parameters, each set of parameters including a diameter of the reflector, a focal distance of the reflector, and an offset distance, measured between the vertex of a paraboloid in which the reflector is inscribed and the tip of the reflector that is closest to said vertex:
   diameter between 220 and 270 centimetres, focal distance between 380 and 420 centimetres, offset distance between 65 and 105 centimetres,
   diameter between 220 and 270 centimetres, focal distance between 358 and 398 centimetres, offset distance between 90 and 130 centimetres,
   diameter between 220 and 270 centimetres, focal distance between 375 and 415 centimetres, offset distance between 90 and 130 centimetres.

9. The face according to claim 7, wherein the face includes at least two reflectors.

10. The face according to claim 9, wherein the face further includes holding and releasing devices comprising a portion detachable on command and allowing to hold the reflectors in the retracted position during a phase of launch of the satellite and release the reflectors into the deployed position once the satellite is in orbit, wherein the various reflectors share the same holding and releasing devices.

11. The face according to claim 9, wherein the reflectors are concentric when the reflectors are in the retracted position.

12. The face according to claim 9, wherein the sources and/or the deployment devices are aligned according to a transverse axis of the face.

13. A satellite including a face according to claim 7.

* * * * *